June 24, 1930.  W. ALTNER  1,765,898
ELECTRIC UNIVERSAL INDICATOR
Filed Dec. 21, 1928
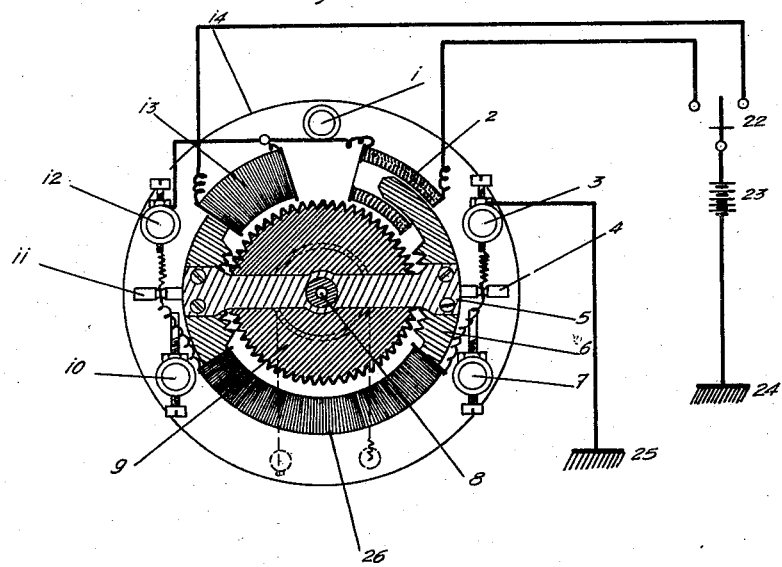
Fig. I
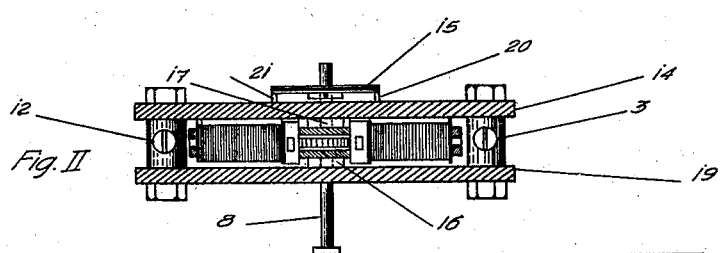
Fig. II
Inventor:

Patented June 24, 1930

1,765,898

UNITED STATES PATENT OFFICE

WALDEMAR ALTNER, OF PACHUCA, MEXICO

ELECTRIC UNIVERSAL INDICATOR

Application filed December 21, 1928, Serial No. 327,703, and in Mexico December 10, 1928.

This invention refers to an electric universal indicator, which may be used for many different purposes, but always with the object of indicating movement of any kind. One of the most important uses of the indicator is as a secondary clock, but it may be used for instance for indicating the level of liquids at distance; as indicator of the position of certain valves which it is desired to watch, in any kind of installations.

The apparatus may be used for indicating the strength or the direction of the wind, either on board ships or at aviation fields. It may be used also for counting piece goods at long distance and as an indicator in a central office of the movement of vehicles as trains, tramways, etc.

The number of movements which may be indicated by the present invention is unlimited.

The apparatus is of a very simple construction and will work with any kind of current. The cost of operation is very small and there is very little friction in all the parts of the apparatus wherefore it will last very long, as a matter of fact for life time. In the specification I am giving some examples of the range of use of the apparatus, but it is to be understood that my invention is not limited to those uses and that I claim the use of the apparatus for the recording of any movement.

In the accompanying drawing the apparatus is shown in cross-section in both Fig. 1 and Fig. 2.

Referring to the drawing:

(14) and (19) are two metal plates forming the housing of the apparatus. These plates are of brass or any other non-magnetic metal. In these plates are provided the two bronze bearings (16) and (17), in which the shaft (8) rotates. On said shaft (8) is fixed the toothed wheel or disc (9). At one end of the shaft is placed the brake pulley (15) which as the toothed wheel is connected firmly to the shaft. On the other end of the shaft is firmly fixed the needle (18). The toothed wheel is made of soft iron.

On the flange of the bearings (16) and (17) are fixed the two rotatory bridge contact pieces (5), which carry a ring or annular plate of soft iron (6), which is open at its upper end and provided with a number of teeth on the inside at both sides. Four metal screws keep the bridge pieces fastened to the ring of soft iron, so that this last will rotate around the toothed wheel by means of said bridge pieces.

(3) and (12) are staybolts of insulated material, which are screwed into the plate (14) of the housing. Each of these staybolts carries a set-screw for regulating the tension of a spring. This spring is connected at its other end to a stop of insulating material on the circumference of the iron ring. (1) and (10) are brass bolts which keep the plates of the housing at the proper distance one from the other, and in a firm manner.

The inferior bolts (7) and (10) each carry a set screw by means of which the movement of the iron ring is limited. Firmly secured to the iron ring (6) in the lower part is the spool (26). One end of the spool is soldered to a spiral spring while the other end is soldered to another spiral spring. The two superior spools (2) and (13) are firmly secured to the plate (14) of the housing. The extremes of the iron ring enter into the two superior spools and form in this manner the iron core for the solenoid.

(23) is a source of current. (24) and (25) are earth connections; (4) and (11) are insulated stops provided on the circumference of the iron ring.

The function of the apparatus is as follows:

When the switch (22) is connected to the contact at the left, current will flow from the source through the switch to the spool (2), from there through the set screw at (12) through the spring to the spool (26), through the spring and set screw at (3) to earth connection (25), and from there through earth to earth connection (24) and back to the source. By means of the current the spool (2) will attract the iron core inwardly until the insulated stop (11) touches set screw at (10). At the same time a magnetic circuit will be formed by the spool (26). The teeth of the iron ring or annular plate are in front of the teeth of the toothed wheel which they hold fast by magnetism. If now, as above described, the iron ring turns by means of the magnetism of the spool (2) the toothed wheel necessarily will also turn. If the circuit is broken at the switch (22), the spools will no longer be magnetic and the spring at (12) will draw the iron ring back to its original position, but as there is no magnetism it will not take the toothed wheel along. The distance between the teeth of the toothed wheel and the teeth of the iron ring is made as small as possible in order to avoid too much intermediate loss in the magnetic power lines. The distance between the insulated stop (11) and set screw (10) at one side and between the insulated stop (4) and the set screw (7) at the other side is made such that it will correspond to the distance between two teeth on the toothed wheel.

Thus the iron ring in one operation of connection will turn the toothed wheel one tooth, and when the circuit is broken the iron ring will return to its original position alone, and the teeth of the same will again be in front of the teeth of the toothed wheel.

In order to obtain this, it will be necessary that both springs of the iron ring be of the same tension. The small residue of magnetism, which might remain in the iron when the circuit is broken could eventually make the toothed wheel retreat a little, and in order to avoid this, the shaft carries a brake pulley (15). In a slot in said pulley works the brake cord whose tension may be regulated by means of a spring and a set screw.

Instead of this arrangement others may of course be used, but this is far the cheapest.

The brake might be effected by magnets as in the electric meters.

By placing the switch (22) on the contact to the right (Fig. 1) the course of the current would be the following:

The current comes from the source (23), through the switch (22) to the contact to the right, from there to the spool (13). Leaving this it goes through set screw and spring at (12) to the spool (26); from here it goes through the set screw and spring at (3) to earth connection (25), and from there through the earth to earth connection (25) and finally back to the source. By this the spool (13) will attract the iron ring inwardly until the insulated stop (4) engages the set screw (7). At the same time the magnetism obtained in the spool (26) will hold fast the teeth of the toothed wheel which are precisely in front of the teeth of the iron ring, so that the iron ring turns in the direction of the needle of a clock a distance corresponding to one tooth.

When the circuit is broken by the switch (22) the spools will no longer be magnetic and the iron ring (6) will go back to its original position by means of the spring at (3), without carrying the toothed wheel.

Consequently the toothed wheel has turned a distance equivalent to one tooth, and precisely in opposite directions to that of the first described case.

Having thus described my invention, what I claim is:—

In an electric indicator, the combination with main supporting plates of non-magnetic material and means for securing the same in superimposed relation; of a shaft centrally journaled in said plates and a toothed disc of magnetic metal mounted on said shaft for rotation between said plates; an annular ring and means for rigidly securing the same to the shaft, said ring having opposite portions of its inner periphery provided with teeth in magnetic relation to said toothed disc, said disc being adapted for intermittent rotation in unison with said annular ring; an electro-magnetic coil rigidly secured to one portion of the annular ring, said ring having its opposite portion cut away to form solenoid cores; adjustable stop means and means for securing the same to the supporting plates; insulated lugs oppositely located on the periphery of the annular ring, said lugs being alternately engageable with said stop means; and solenoids secured to one of the supporting plates and in circuit with the electromagnetic coil, said solenoids being adapted when alternately energized to effect selective rotation of said annular ring within the limits defined by the said stop means.

In testimony whereof I have affixed my signature.

W. ALTNER.